United States Patent
Gust (10) Patent No.: US 7,552,789 B2
(45) Date of Patent: Jun. 30, 2009

(54) ARRANGEMENT OF A FRONT GATE ON A VEHICLE

(75) Inventor: Peter Gust, Herscheid (DE)

(73) Assignee: Kirchhoff GmbH & Co. KG, Halver (DE)

( * ) Notice: Subject to any disclaimer, the term of this patent is extended or adjusted under 35 U.S.C. 154(b) by 590 days.

(21) Appl. No.: 10/573,106

(22) PCT Filed: Sep. 23, 2004

(86) PCT No.: PCT/EP2004/010674

§ 371 (c)(1),
(2), (4) Date: Mar. 23, 2006

(87) PCT Pub. No.: WO2005/030539

PCT Pub. Date: Apr. 7, 2005

(65) Prior Publication Data

US 2007/0080010 A1    Apr. 12, 2007

(30) Foreign Application Priority Data

Sep. 23, 2003   (DE) .................................. 103 43 882

(51) Int. Cl.
*B62D 25/12* (2006.01)
(52) U.S. Cl. .................................. 180/69.21; 180/69.24
(58) Field of Classification Search ................ 180/69.2, 180/69.21, 69.22, 69.23, 69.24, 69.25
See application file for complete search history.

(56) References Cited

U.S. PATENT DOCUMENTS 4,727,621 A * 3/1988 Emery et al. .................. 16/239

(Continued)

FOREIGN PATENT DOCUMENTS

DE    28 14 107 A    10/1979

(Continued)

OTHER PUBLICATIONS

International Search Report.

*Primary Examiner*—Christopher P Ellis
*Assistant Examiner*—John D Walters
(74) *Attorney, Agent, or Firm*—Collard & Roe, P.C.

(57) ABSTRACT

The invention relates to an arrangement of a front gate on a vehicle, the arrangement comprising at least one hinge system located at the rear in the direction of travel, in the form of a four-bar mechanism with a long arm and a short arm. The hinge system enables the front gate to be pivoted for standard opening and closing, and to be raised at the rear thereof in the event of a collision. To this end, the hinge system comprises an energy accumulator that actuates a displacement device in the event of a collision of the vehicle, said displacement device, in turn, acting directly on the front gate and being detachably connected to the same. The articulations of the four-bar mechanism on the side of the front gate, are fixed to a pivoting lever in an articulated manner, the pivoting lever being detachably fixed to the front gate with one end, in the idle state, and being pivotable in relation to the front gate, with the other end thereof, about a rotary articulation arranged on the front gate in the region of the articulation of the displacement device. If the vehicle crashes, the displacement device raises the front gate in relation to the idle state in such a way that it is guided by the arms of the four-bar mechanism and by the pivoting lever detaching itself on one side from the front gate.

24 Claims, 8 Drawing Sheets

U.S. PATENT DOCUMENTS

| | | |
|---|---|---|
| 6,554,093 B2 * | 4/2003 | Sasaki et al. ................. 180/274 |
| 6,571,901 B2 * | 6/2003 | Lee ............................. 180/274 |
| 6,964,316 B1 * | 11/2005 | Polz et al. ................... 180/274 |
| 7,128,361 B2 * | 10/2006 | Guillez et al. ........... 296/107.08 |

FOREIGN PATENT DOCUMENTS

| | | |
|---|---|---|
| DE | 197 12 961 A | 10/1998 |
| DE | 101 11 146 A1 | 3/2002 |
| DE | 100 55 828 A | 5/2002 |
| DE | 101 44 811 | 3/2003 |
| DE | 203 14 673 U | 12/2003 |

* cited by examiner

ARRANGEMENT OF A FRONT GATE ON A VEHICLE

CROSS REFERENCE TO RELATED APPLICATIONS

Applicant claims priority under 35 U.S.C. §119 of German Application No. 103 43 882.3 filed Sep. 23, 2003. Applicant also claims priority under 35 U.S.C. §365 of PCT/EP2004/010674 filed Sep. 23, 2004. The international application under PCT article 21(2) was not published in English.

The invention relates to an arrangement of a front gate on a vehicle, in accordance with the preamble of claim 1.

To improve the protection of pedestrians, in particular, who can collide with a vehicle in a standard accident situation, it has been known for some time to ensure, by means of various types of devices on the vehicles, that the impact zone of the pedestrian on the vehicle, usually in the region of the front gate, is configured to be softer, and therefore the impact of the pedestrian on the front gate is made milder. For this purpose, it has been described, for example, to provide impact bags similar to the airbag in the interior of the vehicle in this region, which are triggered by corresponding sensors in the front region of the vehicle, if a collision is detected.

Another solution consists in bringing the front gate of the vehicle out of its rest position just above the engine block into a position that has a greater distance from the rigid parts of the vehicle and, in particular, from the engine block, by means of suitable measures, before impact of the pedestrian. For this purpose, it is proposed to set the front gate up in its rear region, and thereby to guarantee a targeted deformation of the front gate during impact of the pedestrian.

To solve this basic problem, a large number of technical devices has been proposed. Thus it is known from DE 2 814 107 A1, for example, to dispose a special device in the rear region of the front gate, which raises the front gate in a very short period of time, relative to its rest position, if a corresponding impact is detected. Furthermore, it is known, for example from DE 197 12 961 A1, to modify the hinge device, which is mainly configured in the form of four-bar hinges, which is required for normal activation of the front gate in any case, in such a manner that an additional setting movement pivots the four-bar hinge out from its rest position, in the case of a collision, in such a manner that the front gate articulated onto the four-bar hinge is raised. An energy accumulator in the form of a helical spring serves for this purpose; it is disposed below the four-bar hinge under bias, and is released from its biased position in the case of a collision and relaxed suddenly. In this connection, the helical spring acts on a lever that raises the two joints of the four-bar hinge on the vehicle body side and thereby raises the entire four-bar hinge as well as the front gate articulated on it.

Furthermore, it is known from DE 101 44 811 A1, instead of allowing a corresponding energy accumulator to act on a lever disposed on the underside of the four-bar hinge, to dispose additional levers on the four-bar hinge for this purpose, the position of which provoke additional movements of the four-bar hinge, because of the sudden release of the energy accumulator, and thereby to bring about greater lift movements of the front gate. However, such ancillary arms make the kinematics of the four-bar hinge more complicated.

It is therefore the task of the present invention to further develop an arrangement of a front gate on a vehicle, in such a manner that a hinge device that acts in simple manner is created, which allows fast and reliable lifting of the rear region of the front gate in the case of a pedestrian collision with the front gate and, at the same time, is structured with a simple design and in reliable manner.

The solution for the task according to the invention results from the characterizing features of claim 1, in interaction with the characteristics of the preamble. Other advantageous embodiments of the invention result from the dependent claims.

The invention proceeds from an arrangement of a front gate on a vehicle, having at least one hinge device in the form of a four-bar mechanism having a long and a short arm, whereby the front gate can be pivoted by means of the hinge device during normal opening and closing, and can be raised in the rear region in the case of a collision of the vehicle. Such an arrangement of a front gate, of this general type, is developed further in that the hinge device has an energy accumulator that activates a displacement device in the case of a collision of the vehicle, which device in turn acts directly on the front gate and is in a releasable connection with it, whereby the front-gate-side articulations of the four-bar mechanism are fixed in place on a pivoting lever, in articulated manner, which lever is releasably fixed in place on the front gate with one end, and can be pivoted relative to the front gate, about a rotary articulation disposed in the region of articulation of the displacement device on the front gate, and the displacement device raises the front gate in the case of a collision of the vehicle, guided by the arms of the four-bar mechanism and the pivoting lever that is released from the front gate on one side, as compared with the rest position. Such an arrangement according to the invention makes it possible to bring about a direct adjustment of the front gate by means of the direct effect of the displacement device on the front gate itself, which makes do without complicated intermediate elements and therefore functions reliably even after a long period of inactivity, i.e. non-activation. The normal function of the front gate during opening is not changed by the arrangement, and therefore takes place in usual manner and without changes for the user. The releasable fixation of the pivoting lever on the front gate is only triggered in the case of a collision, in this connection, and only in this way are the additional kinematics for raising the front gate made available in the rear region, in the case of a collision with a pedestrian or the like. At the same time, when this additional lifting movement is carried out, the front gate continues to be guided securely and can therefore be raised only to the extent predetermined by the design. Therefore impairment of the vehicle driver's ability to see, caused by the front gate, is reliably excluded even in the case of a collision.

In a first advantageous further development, the pivoting lever is releasably fixed in place on the front gate with its one end, in such a manner that when a predetermined force in the direction of the position change of the displacement device is exceeded, the lever releases its releasable connection with the front gate, upon triggering of the energy accumulator, and can be pivoted about its rotary articulation disposed on the front gate at its other end. In this way, it is guaranteed that the pivoting lever cannot release its fixed connection with the front gate as a result of merely minor stresses, for example when driving through potholes or the like, but only if a corresponding threshold of stress is exceeded, for example due to the action of the energy accumulator on the front gate. In this way, the additional movement possibility of the hinge device is then released, and it is made possible to raise the front gate in its rear region. It is advantageous in this connection if the pivoting lever is fixed in place on the front gate with one end, by way of a non-positive lock connection. Such a non-positive-lock connection can be formed, for example, by a mechanical snap-in connection, in which a functional edge on the pivoting lever engages behind a counter-shape disposed on the front gate side, and is snapped into it in the normal state of rest of the front gate. Such a snap-in connection is simple to implement in design and can always be reliably released, even after extended non-activation, so that even after years of non-operation of the hinge device, activation is always reliably guaranteed, in the sense of accident protection. Also, it can be assured, by means of corresponding setting devices, that the force for releasing the snap-in connection adheres precisely to predetermined values, and therefore the operational reliability is increased.

In another embodiment, it is possible that the counter-shape is formed on a separate component that can be fixed in place on the front gate in movable and/or resilient manner. By means of such a configuration, greater mobility or more precisely adjustable force effects can be achieved, for example, particularly if the separate component can be activated by means of the displacement device triggered by the energy accumulator, in a further development, if the displacement device moves out of its rest position during a collision, and thereby releases the non-positive-lock connection of the pivoting lever with the front gate. In this way, it is always reliably assured that a sufficiently great force acts on the separate component, and thereby reliable release of the pivoting lever from the front gate is guaranteed.

An advantageous further development provides that the front-gate-side end of the displacement device stands in a non-positive-lock connection with an essentially bolt-like segment on the front gate by way of a pan-like accommodation. Such a pan-like accommodation has the advantage of allowing mounting of the essentially bolt-like segment on the front gate, in kinematically determined manner, on the one hand, and at the same time, of guaranteeing reliable release of pan-like accommodation and bolt-like segment from one another, even after extended non-activation. This is particularly advantageous if the essentially bolt-like segment on the front gate can be lifted off from the pan-like accommodation during normal activation of the hinge device, to open the front gate by means of the four-bar mechanism. In this way, it is always guaranteed that the assignment of the front gate to the pan-like accommodation reaches a defined state and thereby a defined mobility of the front gate and a clear transfer of the forces from the energy accumulator to the front gate is present when the rear region of the front gate is raised in the case of a collision.

It is advantageous in this connection that when the energy accumulator is released in the case of a collision, the pan-like accommodation of the displacement device suddenly shifts the bolt-like segment on the front gate in the direction towards the raised position of the front gate, and when this happens, the pivoting lever releases its non-positive-lock connection with the front gate at its end that is releasably fixed in place on the front gate, and pivots, relative to the front gate, about its rotary articulation formed on the other end. In this connection, the interaction of the pivoting lever with the two arms of the four-bar hinge guarantees the additional required mobility of the front gate so that it can be raised in its rear region. With this, however, the path of the front gate while it is being raised, as well as the maximal raising height are clearly defined, and the front gate is securely fixed in place on the vehicle body side, during this entire movement and also in the raised position.

In the state of rest, it is advantageous if the front-gate-side end of the displacement device is disposed and fixed in place on the vehicle body side, with the pan-like accommodation of the front gate, in such a manner that the essentially bolt-like segment on the front gate is accommodated in the pan-like accommodation. In this state, the pan-like accommodation simply forms a fixed counter-bearing for the bolt-like segment of the front gate, so that the front gate can be brought back into a defined state again after normal opening and closing, and is securely held there for normal operation of the vehicle.

With regard to the kinematics of the front gate when it is raised in its rear region in the case of a collision, it is advantageous if the rotary articulation of the pivoting lever on the front gate and the bolt-like segment of the front gate have an identical point of rotation. In this way, the mobility of the pivoting lever and, at the same time, the mounting of the bolt-like segment on the front gate can be produced in simple manner, in terms of design, for one thing, and for another, there is the result, in a further embodiment, that by means of the rotary movement of the pivoting lever, on the one hand, and the setting movement of the displacement device, on the other hand, the front gate performs a pure pivoting movement about a closure device disposed on the front end of the vehicle, on the front gate, without relative displacements of the front gate in the longitudinal direction of the vehicle, relative to the closure device. In this way, it is reliably precluded that the front gate can jam on the closure device disposed on the front end, when it is raised in its rear region. If a displacement of the front gate in the longitudinal direction of the vehicle occurs in the region of this closure device disposed on the front end, jamming and incomplete raising of the front gate can occur, thereby reducing the protective effect of the raised front gate, or actually bringing it down to zero. This possibility can be reduced to zero by means of coordinating the kinematics of the pivoting lever with the direct effect of the displacement device on the front gate and the position of the points of rotation relative to one another, in each instance, in such a manner that no kind of longitudinal displacement of the front gate occurs in the region of the closure device on the front end.

It is advantageous if the energy accumulator has a biased mechanical spring, particularly a helical spring. Such mechanical springs can always be reliably activated, even after many years of non-operation, are constructed in mechanically robust manner, and can be re-biased, by means of corresponding forces, at any time. Even dirt or vibrations in normal driving operation do not impair the functions of mechanical springs in the case of a collision.

Another embodiment provides that the displacement device has an essentially rod-like segment that is disposed in the interior of the helical spring, and is held counter to the force of the biased helical spring at one end, and carries the pan-like accommodation for the bolt-like segment on the front hood at its other end. By means of this configuration, it is possible to structure the displacement device as well as the energy accumulator in very compact manner, so that a corresponding expansion of a conventional hinge device requires only slightly more space than the non-modified hinge device.

Furthermore, it is possible that the energy accumulator is held in its biased state, in the rest position, by means of a triggering device. Such a triggering device, which, in a further embodiment, can be controlled by way of an actor, for example, in the case of a collision, and can release the energy accumulator from its biased state by way of lever devices, with mechanical reinforcement, secures the displacement device with regard to unintentional release and, at the same time, allows reliable release of the displacement device even after many years of non-operation.

Activation of the triggering device can be structured in particularly simple manner if the actor has an electromechanical switch. Such an actor can use the electrical energy available in the vehicle in any case, and allows a relatively great setting force, as well as a short response time.

It is furthermore advantageous if the triggering device has a hook-like segment that engages behind an assigned segment of the rod-like segment of the displacement device in the rest position, and secures the displacement device in its position, against the effect of the energy accumulator. In this connection, in a further embodiment, the hook-like segment of the triggering device, the displacement device, and the energy accumulator can be brought back into their starting state and activated again after triggering of the front gate. By means of such a simple and operationally reliable mechanism, the force of the actor can be reliably implemented and the energy accumulator can be triggered in simple manner. At the same time, the system is configured to be reversible, so that after a collision, the hinge device can easily be brought back into its normal rest position, which is important, in particular, in the case of false triggering, without a subsequent impact, for example, and at the same time, reduces costs.

Likewise, it is possible, in another embodiment, that the energy accumulator has a fluid medium. For this purpose, hydraulic media, gas media, or also fluid media produced by means of pyrotechnics can be used, for example, in order to introduce a great energy density into the hinge device during a short period of time.

It is advantageous in terms of assembly and adjustment technology if the pivoting lever and the bolt-like segment are fixed in place on the front gate by means of a common assembly part. In this way, the entire module, pre-assembled as a whole, can be affixed and adjusted on the front gate, thereby making it possible to greatly reduce the assembly costs.

With regard to a further improvement of the collision behavior, it is advantageous if the hinge device can be locked in place after the front gate has been raised, in the raised state as compared with the rest state. Otherwise, it is possible for the front gate to move back into a lowered position before or during a collision with a person, counter to the force of the energy accumulator and, in particular, the spring force, and therefore the distance of the front gate, for example from non-resilient engine components, is reduced again, for example, thereby canceling out the protective effect of the raised front gate, in whole or in part. This is prevented if individual rotary articulations of the hinge device are locked in place relative to one another in the raised position that has been reached, for example in that at least one locking device is disposed on the pivoting lever and/or on the arm or arms, which device prevents the relative movement of pivoting lever and/or arms relative to one another in the raised state of the front gate. Therefore, however, the front gate can no longer automatically move back to a less raised position, and the full protective effect on the basis of the deformation behavior and the deformation path of the front gate is reliably maintained. It is advantageous in connection with the implementation of this locking system if the at least one locking device has a cam that engages into a corresponding countershape in the raised state of the front gate, as compared with the rest state, and locks pivoting lever and/or arms releasably with one another, in the raised state of the front gate. Such snap-in or locking connections are fundamentally known and can be configured in many different ways.

A particularly preferred embodiment of the arrangement according to the invention is shown in the drawing.

This shows.

Figure 3:
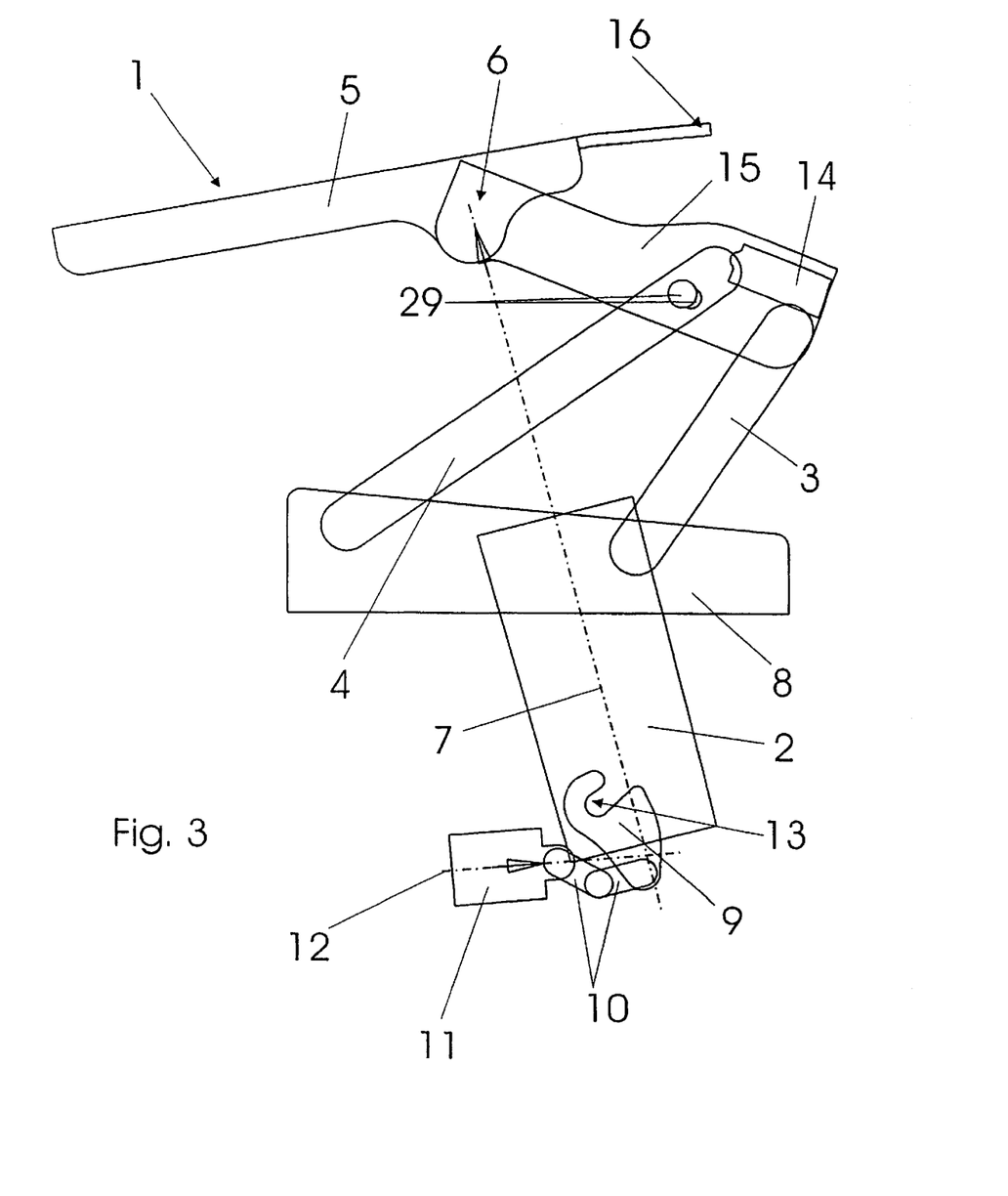
Figure 4:
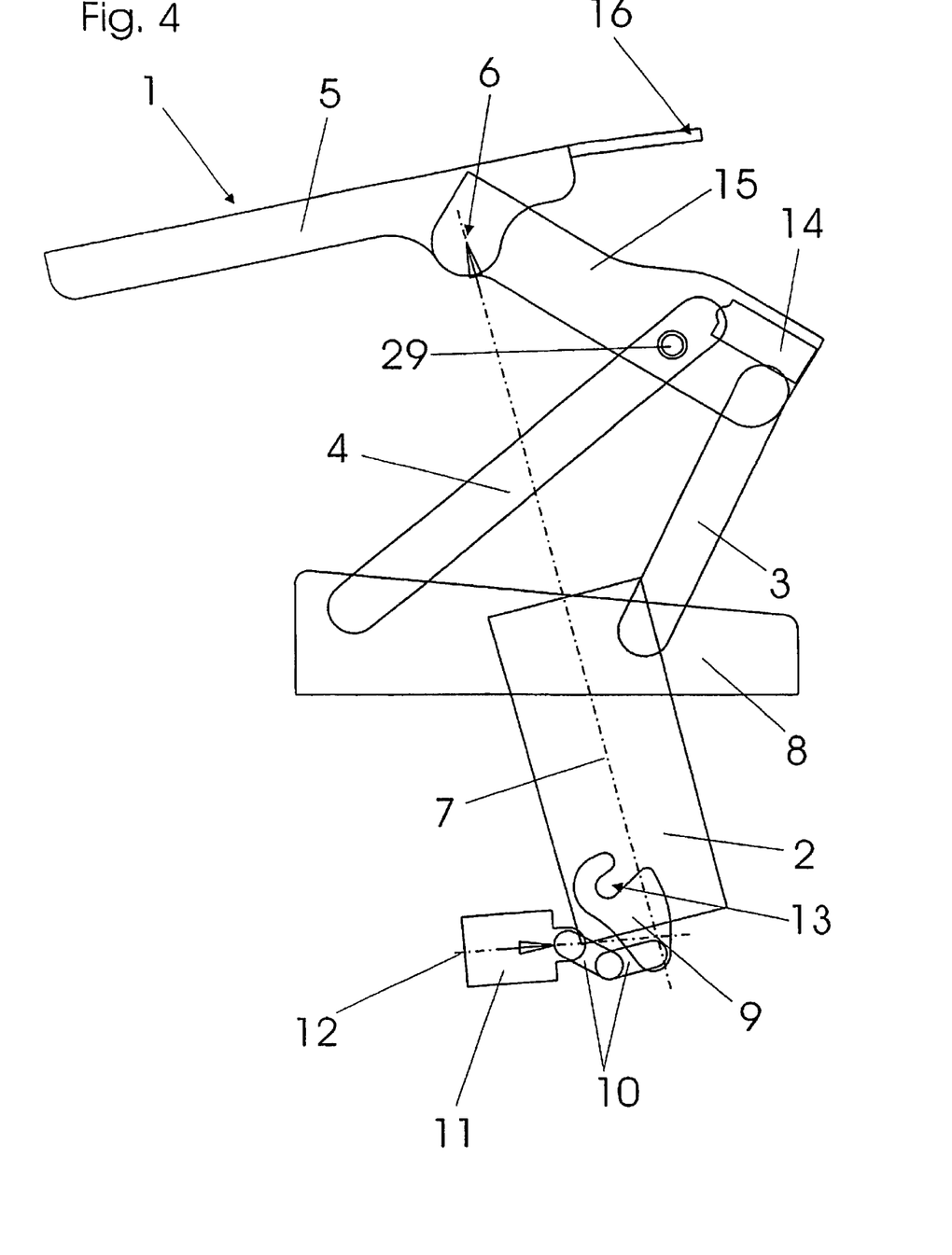
Figure 5:
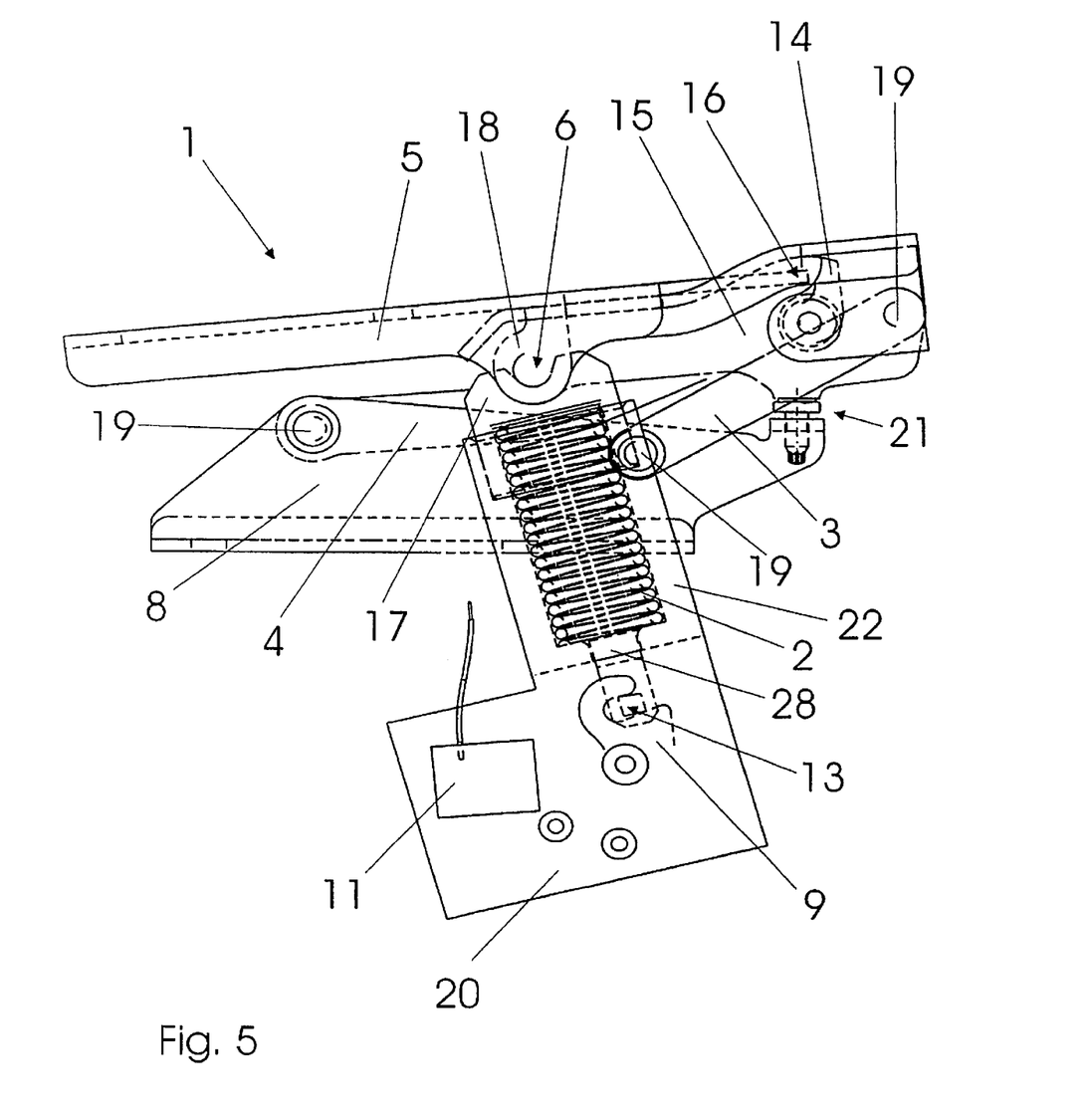
Figure 6:
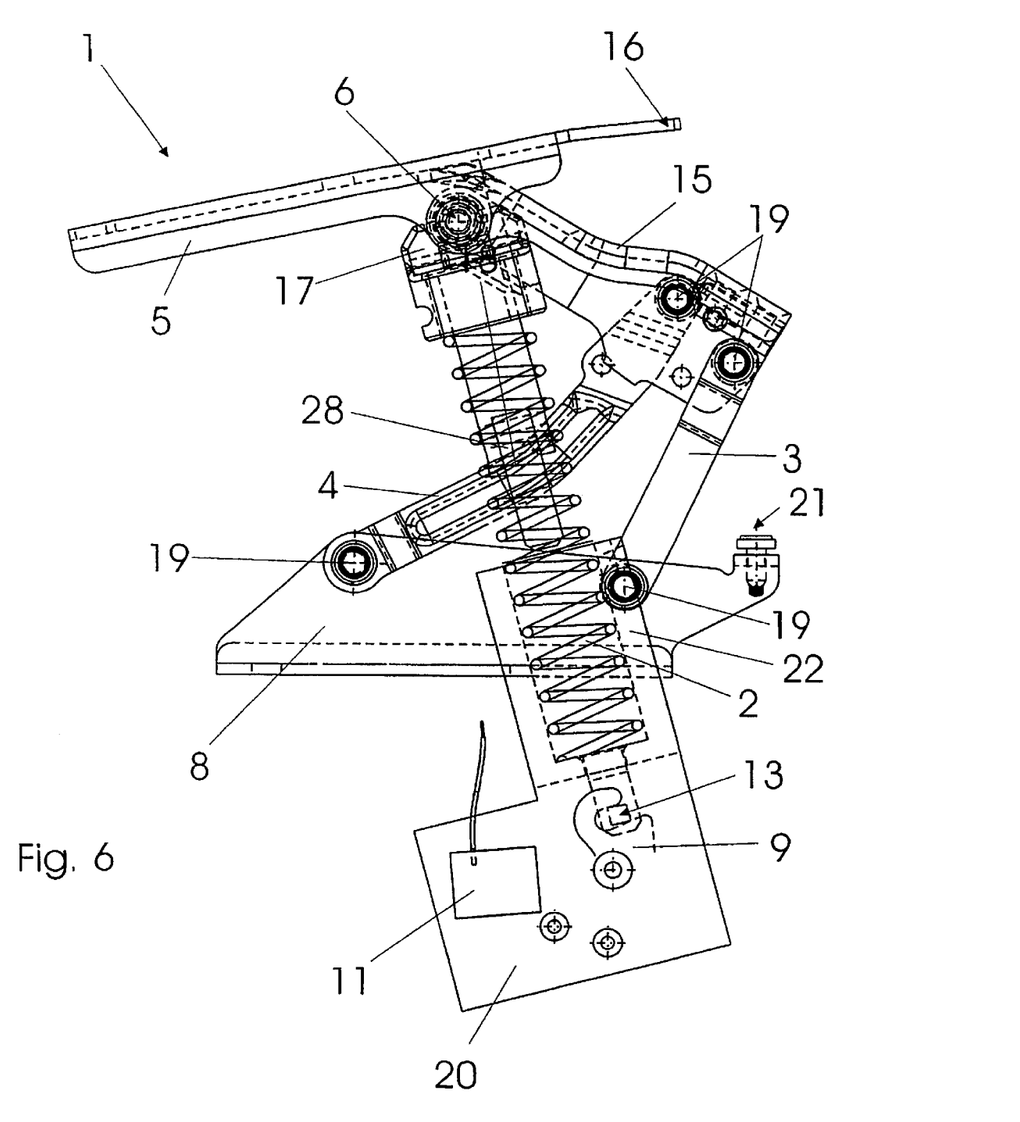

FIGS. 1 to 4 as well as 5 and 6 show a first embodiment of the hinge device according to the invention, whereby FIGS. 1 to 4 give a very schematic representation of the functional principle, and FIGS. 5 and 6 show the design development of a correspondingly structured hinge device. The same reference numbers refer to the same components and/or functions in all the figures.

The hinge device according to the invention proceeds from a known four-bar hinge device, in which two arms 3, 4 are fixed in place so as to rotate on a base bracket 8 that can be fixed in place on a vehicle, on the vehicle body side, by way of an articulation 19. The two arms 3, 4 have different lengths and thereby describe the movement path of a unit formed from a mounting plate 5 and a pivoting lever 15, with which the two arms 3, 4 are also connected so as to rotate, with their opposite ends, by means of articulations 19. In this connection, the mounting plate 5 and the pivoting lever 15 are releasably fixed in place on one another, in a manner that will be described in greater detail below, and can perform a relative rotation about a rotary articulation 6, relative to one another. The two rotary articulations 19 of the arms 3, 4, which are fixed in place on the unit consisting of mounting plate 5 and pivoting lever 15, facing the front gate 27, which is only indicated, are, to state it more precisely, fixed in place on the pivoting lever 15 so as to rotate, at a distance from one another. In this connection, the mounting plate 5 serves for fixation on the front gate 27, in a manner not shown in particular detail, which gate covers the engine space of a vehicle, not shown in greater detail. To reduce injuries that a pedestrian can suffer during a typical pedestrian accident, as the result of a collision with the front gate 27 of the vehicle, the front gate 27 is raised as compared with its rest position shown in FIG. 1, by means of the hinge device 2, in a manner that will be described in greater detail below, if a corresponding impact of a pedestrian or the like is detected by sensors, not shown in greater detail, in the front region of the vehicle.

An energy accumulator 2, which can advantageously be configured as a helical spring 2 that is accommodated with bias in a guide sleeve 22, and held in the biased state by means of a triggering device 9, 10, 11, 13, in a manner to be described in greater detail below, serves to suddenly raise the front gate 27 in its rear region, seen in the direction of travel. In this connection, a displacement device consisting of a rod-like segment 28 and a pan-like accommodation 17, which is disposed on the front-gate-side end of the rod-like segment 28 and connected with the latter, runs through the center region of the helical spring 2. On the end of the rod-like segment 28 that lies opposite the pan-like accommodation 17, a projection 13 is disposed, which is surrounded by a hook-like triggering lever 9 of the triggering device 9, 10, 11, 13. In this way, the rod-like segment 27 pulls the helical spring 2 into the guide sleeve 22 and biases it while doing so, by means of the end having the pan-like segment 17, in this rest position. When the triggering lever 9 is released, in a manner that will be described in greater detail below, the energy content of the biased helical spring 2 is suddenly released, and suddenly displaces the pan-like accommodation 17 in the displacement direction 7 of the energy accumulator 2. In this way, a bolt-like segment 18 on the mounting plate 5 and therefore the front gate 27 fixed in place on the mounting plate 5 is also suddenly moved in the displacement direction 7 of the energy accumulator 2, and the front gate 27 is raised in its rear region when this happens.

In this connection, the guidance of the front gate 27 during this movement takes place, on the one hand, by way of the arms 3, 4 of the four-bar mechanism and, on the other hand, by way of the interaction of mounting plate 5 and pivoting lever 15. At the beginning of the movement of the front gate 1 in an upward direction (shown in FIG. 1), the mounting plate 5 and the pivoting lever 15 form a unit, since they are connected with one another in non-positive-lock manner by way of a snap-in connection composed of a snap-in edge 14 and a counter-edge 16. The snap-in edge 14, which is only indicated schematically in FIGS. 1 to 4, is formed, in this connection, by means of an additional part that is disposed on the pivoting lever 15 in fixed manner and provided with a nose, for example. Since the pivoting lever 15 and the mounting plate 5 are mounted so as to rotate relative to one another, by means of the rotary articulation 6, a clear assignment between snap-in edge 14 and counter-edge 16 is guaranteed in the rest position according to FIG. 1. If the energy accumulator 2 in the form of the helical spring 2 is now moved in the direction 7 by means of activation of the triggering lever 9 and release of the projection 13, the mounting plate 5 is moved on a different path than the pivoting lever 15, which has only limited mobility, because of the articulations 19 of the arms 3, 4. In this way, the snap-in connection between the snap-in edge 14 and the counter-edge 16 is necessarily canceled out, and the pivoting lever 15 performs a relative rotation with regard to the mounting plate 5 and the front gate 27 disposed on it. The front gate is held in a manner not shown, but fundamentally known, in the front region of the vehicle, not shown, by means of a closure device, and can only perform a rotary movement about this closure device. Therefore the possible path of the front gate 27 in its rear region is also predetermined, so that the mounting plate 5 will rotate about the front closure device, in a corresponding manner.

Figure 1:
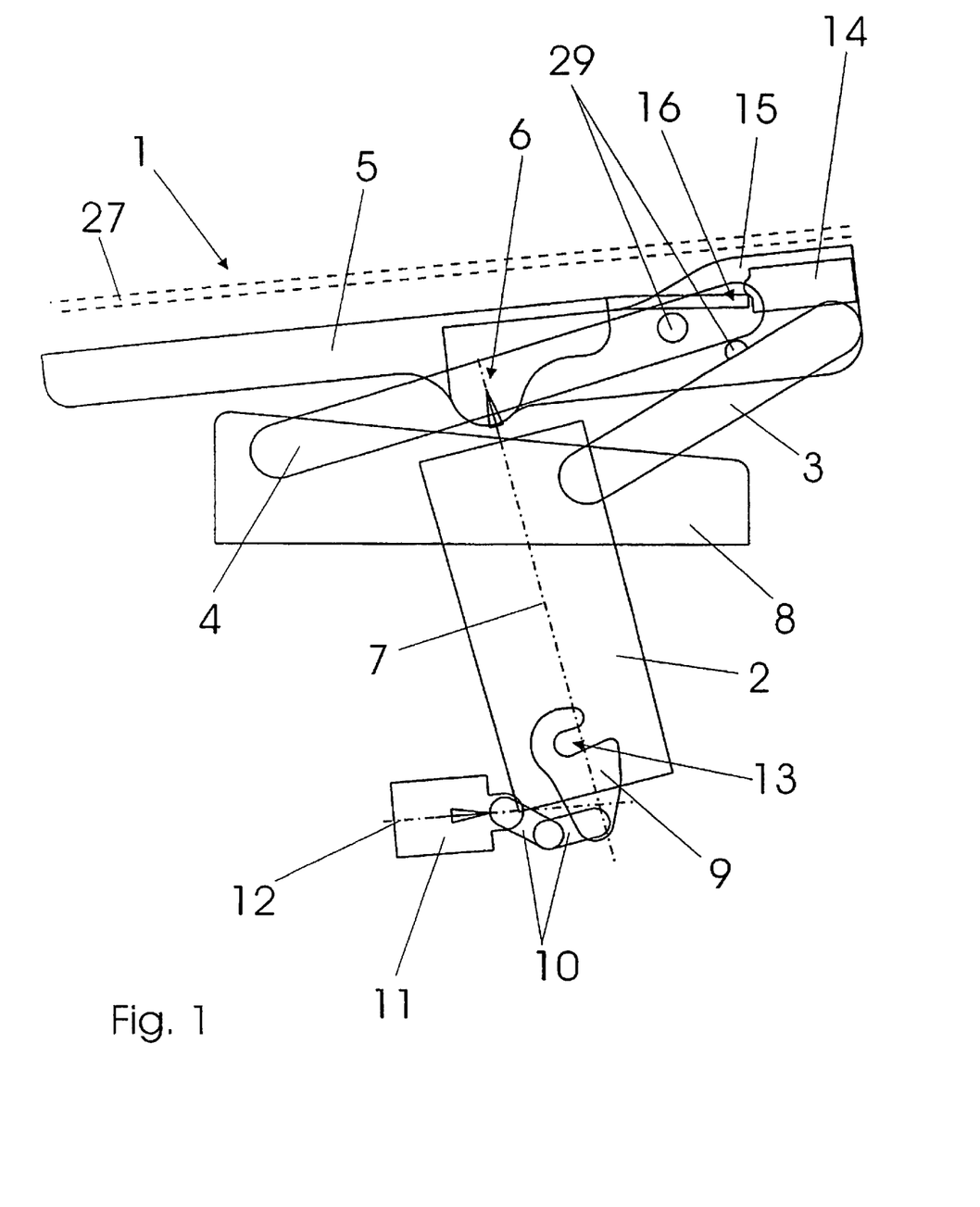
FIG. 1—a first embodiment of the hinge device according to the invention, in a schematic representation, in the rest state, FIG. 2—the hinge device according to the invention, according to FIG. 1, after triggering of the energy accumulator, in a slightly raised state, FIG. 3—the hinge device according to the invention, according to FIG. 1, in a further raised state, FIG. 4—the hinge device according to the invention, according to FIG. 1, in its furthest raised end position, FIG. 5—the hinge device according to the invention, according to FIG. 1, in a representation whose design has been developed further, in the rest state, FIG. 6—the hinge device according to the invention, according to FIG. 1, in a representation whose design has been developed further, in its furthest raised end position, FIG. 7—a hinge device that has been modified as compared with FIG. 1, having a separate triggering lever for pivoting the pivoting lever, in the rest state, FIG. 8—the hinge device according to FIG. 7, in its furthest raised end position.
Figure 2:
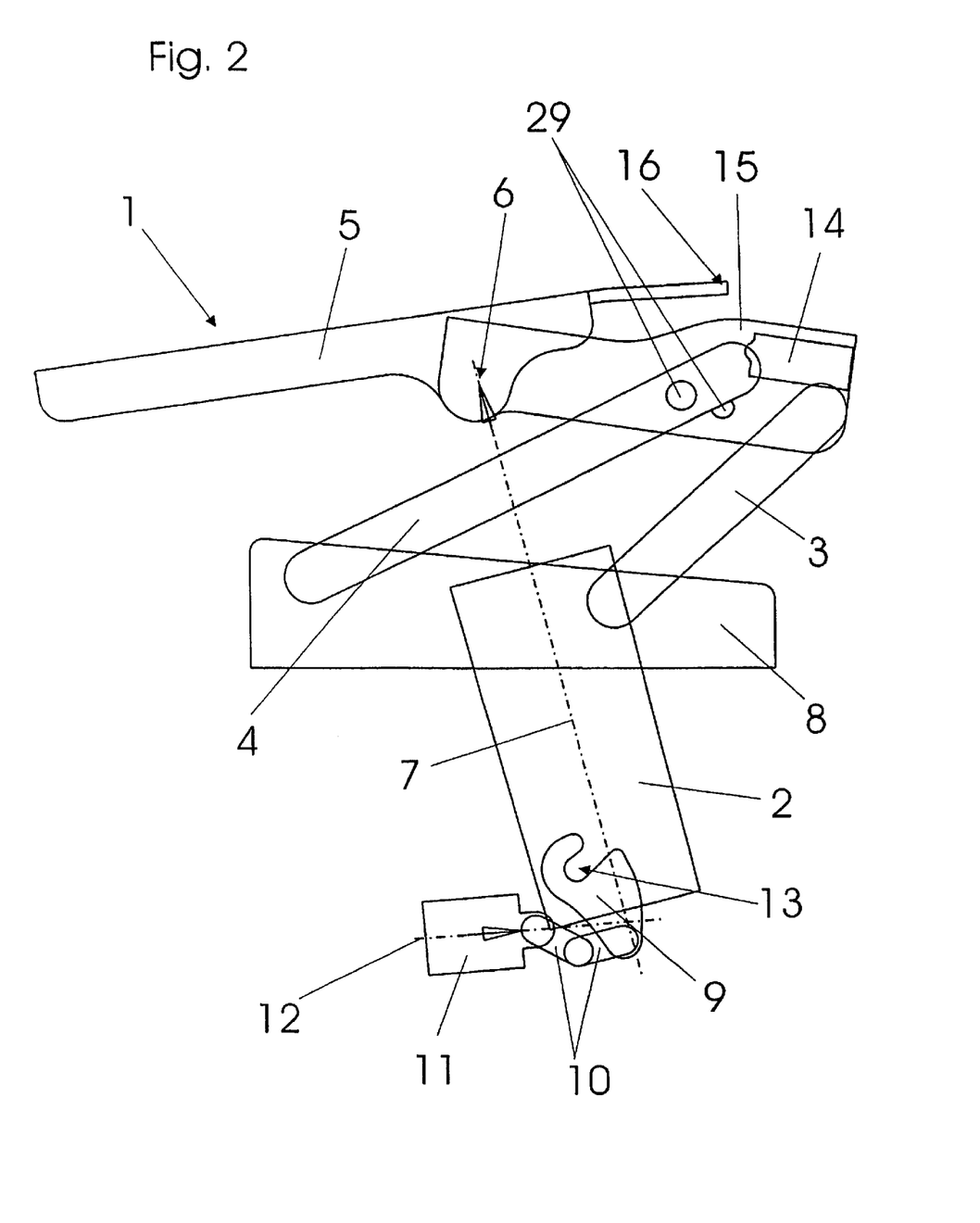

As can be seen better in FIGS. 2, 3 and 4, the pivoting lever 15 turns ever farther relative to the mounting plate 5, with an increasing movement of the helical spring 2 in the displacement direction 7, until it has reached its kinematically possible end position as shown in FIG. 4. In this end position, the front gate 27 is raised as far as maximally possible, and therefore offers a corresponding resilience by means of deformation into the free region below the front gate 27, in the case of a collision of a pedestrian with the front gate 27. In this connection, the front gate can also be locked in place in this raised position, even without the effect of the spring force of the helical spring 2, in that a releasable locking device 29, indicated only schematically as two circles that are made to overlap in the raised position, for example a catch or cam or notch, which engages into a corresponding counter-shape, prevents the relative movement between arm 4 and pivoting lever 15. In this way, the hinge device 1 itself is prevented from moving, and can no longer be reliably adjusted in the case of effects of impact forces from a collision with a pedestrian, for example. The locking device 29 itself can be configured in releasable manner, in this connection, so that after false triggering of the hinge device 1, the front gate can be set back into the rest state. Of course, it is also possible to dispose the locking device 29 on other locations of the hinge device 1, alternatively or supplementally, and thereby to prevent the relative movement of these elements of the hinge device 1 in the raised state of the front gate 27, as well.

Triggering of the helical spring takes place, in this connection, under the control of a sensor, not shown, in the front region of the vehicle, in that current is applied to an actor 11, and brings about a displacement of a corresponding setting element of the actor 11 in the displacement direction 12. This displacement movement is transferred to the triggering lever 9 by way of intermediate transfer levers 10; the former then performs a pivoting movement to release the projection 13 of the rod-like segment 28, in a manner not shown in greater detail. Using such a triggering device 9, 10, 11, 13, it is possible to reliably guarantee that the triggering lever 9 releases the projection 13 even after a long period of non-activation. In this way, the rod-like segment 28 is then released, and accelerated in the displacement direction 7, by means of the helical spring 2, as already described. The actor 11, the levers 10, as well as the triggering lever 9 and the related rotary articulations are pre-assembled on a mounting plate 20, and can therefore be installed in the vehicle in simple manner.

As is particularly evident from FIGS. 5 and 6, the articulation of the rod-like segment 28 in its end region facing the front gate 27 is implemented by way of a pan-like accommodation 17, which has a bolt-like segment 18 in the region of the rotary articulation 6 on the mounting plate 5, and thereby indirectly on the front gate 27. This method of transferring the displacement movement of the displacement device 17, 28 has its reason in the fact that the hinge device 1 must allow raising of the front gate 27 in normal operation, which can be utilized for opening an engine compartment of the vehicle, for example. For this purpose, the movement of the front gate 27 is controlled solely by the arms 3, 4 of the four-bar mechanism, in fundamentally known manner, but for this purpose, it must be possible for the front gate 27 to move relative to the displacement device 17, 28. For this purpose, the bolt-like segment 18 can be lifted off from the pan-like accommodation 17 of the displacement device 17, 28, and is laid into the pan-like accommodation 17 again after the front gate 27 has been closed, by means of kinematic guidance of the arms 3, 4 of the four-bar mechanism. With this, however, the normal opening movement of the front gate 27 is not impaired in any manner by means of the expansion of the hinge device 1 to include the raising function, but at the same time, a precise assignment of front gate 27 to displacement device 17, 28 is achieved.

The rest position of the hinge device 1 is limited and predetermined by setting down a segment of the pivoting lever 15 on a corresponding stop 21, in this connection, whereby the stop 21 can be adjustable, in order to be able to make an adjustment of the position of the front gate 27 after installation in the vehicle. The farthest moved-out position of the hinge device 1, according to FIG. 6, results, in this connection, from the kinematic limitation of the stroke of the pivoting lever 15 and the mounting plate 5.

Figure 7:
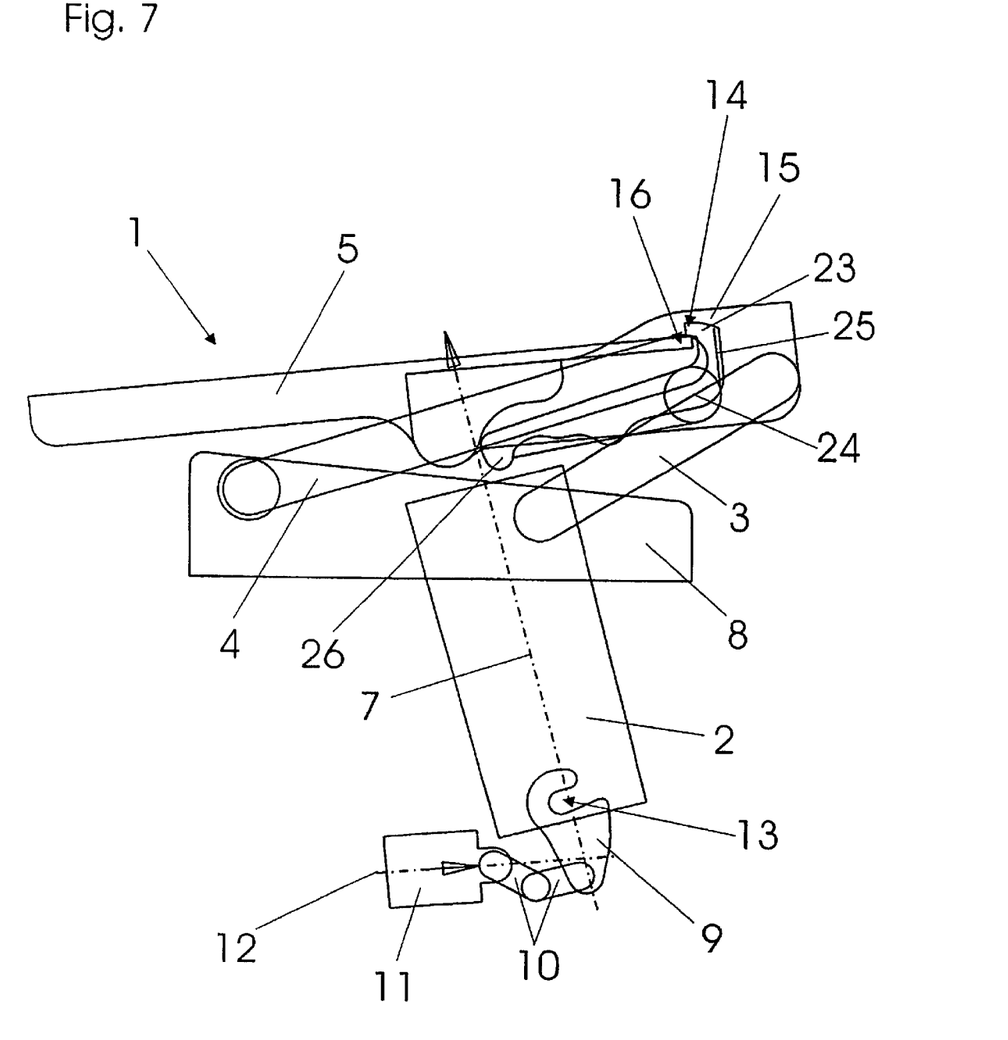
Figure 8:
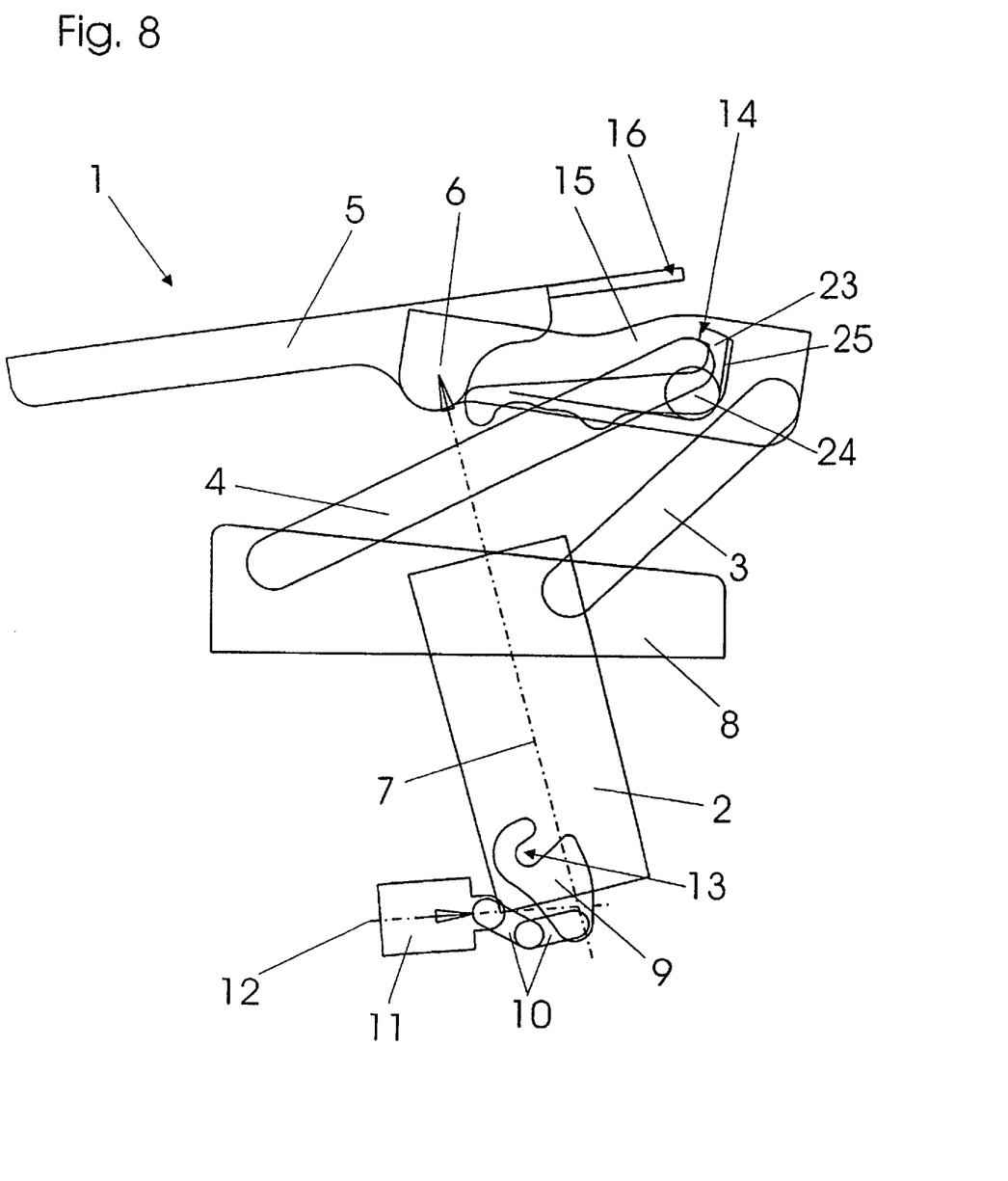

A slightly modified hinge device 1 is shown in FIGS. 7 and 8, in which the snap-in connection 16, 14 between pivoting lever 15 and mounting plate 5 is produced by means of a separate component, in this case a snap-in lever 23. This snap-in lever 23 can rotate on the pivoting lever 15, by means of an articulation 24, and is mounted in resilient manner, by way of a spring 25, and can thereby engage over the counter-edge 16 of the mounting plate 5 in one of its end positions, and thereby produce the snap-in connection. On the opposite end of the snap-in lever 23, a nose 26 is provided, which projects into the region of the energy accumulator 2, and is necessarily activated by the pan-like accommodation 17 when the energy accumulator 2 is triggered and the pan-like accommodation 17 is accelerated, not shown in further detail. In this way, the snap-in lever 23 is rotated in such a manner that it releases the counter-edge 16 on the mounting plate 5 with its snap-in edge 14, and thereby brings about the separation of pivoting lever 15 and mounting plate 5, with fixed rotation. In this connection, the spring 25 serves to bring the snap-in lever 23 back into its starting position after the counter-edge 16 has been released, in which renewed engagement with the counter-edge 16 is possible, once the energy accumulator 2 has been biased again, and the hinge device 1 has been put back into its starting state.

REFERENCE NUMBER LIST

1—hinge device
2—energy accumulator/helical spring
3—arm, four-bar mechanism
4—arm, four-bar mechanism
5—mounting plate, front gate
6—rotary articulation
7—displacement device, energy accumulator
8—base bracket
9—triggering lever
10—transfer lever(s)
11—actor
12—displacement device, actor
13—projection
14—snap-in edge
15—pivoting lever
16—counter-edge
17—pan-like accommodation
18—bolt-like segment
19—rotary articulation, four-bar mechanism
20—mounting plate, triggering device
21—stop
22—guide sleeve, energy accumulator/helical spring
23—snap-in lever
24—rotation point, snap-in lever
25—spring
26—nose, snap-in lever
27—front gate
28—rod-like segment
29—locking device

The invention claimed is:

1. Arrangement of a front gate (27) on a vehicle, having at least one hinge device (1) that lies in the rear, viewed in the direction of travel, in the form of a four-bar mechanism (3, 4) having a long and a short arm, whereby the front gate (27) can be pivoted during normal opening and closing, by means of the hinge device (1), and can be raised in the rear region in the case of a collision of the vehicle, wherein the hinge device (1) has an energy accumulator (2) that activates a displacement device (17, 28) in the case of a collision of the vehicle, which device in turn acts directly on the front gate (27) and stands in a releasable connection with it, whereby the front-gate-side articulations (19) of the four-bar mechanism (3, 4) are fixed in place on a pivoting lever (15), in articulated manner, which lever is releasably fixed in place on the front gate (27) in the state of rest, with one end, and can be pivoted relative to the front gate (27) with its other end, about a rotary articulation (6) disposed on the front gate (27) in the region (18) of the articulation of the displacement device (17, 28), and the displacement device (17, 28) raises the front gate (27), guided by the arms (3, 4) of the four-bar mechanism, and the pivoting lever (15) that is released from the front gate (27) on one side, as compared with the state of rest, in the case of a collision of the vehicle.

2. Arrangement according to claim 1, wherein the pivoting lever (15) is releasably fixed in place on the front gate (27) with its one end, in such a manner that when a force that can be predetermined, in the direction towards a change in position of the displacement device (17, 28), is exceeded, it releases its releasable connection with the front gate (27) when the energy accumulator (2) is triggered, and can be pivoted about its rotary articulation (6) disposed on the front gate (27) on the other end.

3. Arrangement according to claim 2, wherein the pivoting lever (15) can be fixed in place on the front gate (27) with one end, by way of a non-positive-lock connection (16, 14).

4. Arrangement according to claim 3, wherein the non-positive-lock connection (16, 14) is formed by means of a mechanical snap-in connection, in which a functional edge (16) on the pivoting lever (15) engages behind a counter-shape (14) disposed on the front gate side, and is locked in place with it in the normal state of rest of the front gate (27).

5. Arrangement according to claim 4, wherein the counter-shape (14) is formed on a separate component (23), which is fixed in place on the front gate (27) in movable and/or resilient manner.

6. Arrangement according to claim 5, wherein the separate component (23) can be activated by the displacement device (17, 28) triggered by the energy accumulator (2), if the displacement device (17, 28) moves out of its rest position in the case of a collision and, in this connection, releases the non-positive-lock connection (16, 14) of the pivoting lever (15) with the front gate (27).

7. Arrangement according to claim 1, wherein the front-gate-side end of the displacement device (17, 28) stands in a non-positive-lock connection with an essentially bolt-like segment (18) on the front gate (27), by way of a pan-like accommodation (17).

8. Arrangement according to claim 7, wherein the essentially bolt-like segment (18) on the front gate (27) can be raised from the pan-like accommodation (17) during normal activation of the hinge device (1) for opening the front gate (27) by means of the four-bar mechanism (3, 4).

9. Arrangement according to claim 1, wherein when the energy accumulator (2) is released in the case of a collision, the pan-like accommodation (17) of the displacement device (17, 28) suddenly displaces the bolt-like segment (18) on the front gate (27) in the direction towards the raised position of the front gate (27) and, in this connection, the pivoting lever (15) releases its non-positive-lock connection (16, 14) with the front gate (27), at its end that is releasably fixed in place on the front gate (27), and pivots about its rotary articulation (6), relative to the front gate (27), formed at its other end.

10. Arrangement according to claim 1, wherein the front-gate-side end of the displacement device (17, 28) is disposed and fixed in place on the vehicle body side with the pan-like accommodation (17), in the normal state of rest of the front gate (27), in such a manner that the essentially bolt-like segment (18) on the front gate (27) is accommodated in the pan-like accommodation (17).

11. Arrangement according to claim 1, wherein the rotary articulation (6) of the pivoting lever (15) on the front gate (27) and the bolt-like segment (18) of the front gate (27) have an identical point of rotation.

12. Arrangement according to claim 1, wherein by means of the rotary movement of the pivoting lever (15), on the one hand, and the setting movement (7) of the displacement device (17, 28), on the other hand, the front gate (27) performs a pure pivoting movement about a closure device disposed on the front gate (27), on the front end of the vehicle, without a relative displacement of the front gate (27) in the longitudinal direction of the vehicle, relative to the closure device.

13. Arrangement according to claim 1, wherein the energy accumulator (2) has a biased mechanical spring, particularly a helical spring (2).

14. Arrangement according to claim 1, wherein the displacement device (17, 28) has an essentially rod-like segment (28) that is disposed in the interior of the helical spring (2), and is held in place on one end, against the force of the biased helical spring (2), and carries the pan-like accommodation (17) for the bolt-like segment (18) on the front hood (27) at its other end.

15. Arrangement according to claim 1, wherein the energy accumulator (2) is held in its biased state, in its state of rest, by means of a triggering device (9, 10, 11).

16. Arrangement according to claim 1, wherein the triggering device (9, 10, 11) can be controlled by way of an actor (10) in the case of a collision, and releases the energy accumulator (2) from its biased state with mechanical reinforcement by way of lever devices (10).

17. Arrangement according to claim 16, wherein the actor (11) has an electromechanical switch.

18. Arrangement according to claim 1, wherein the triggering device (9, 10, 11) has a hook-like (9) segment that engages behind a related segment (13) of the rod-like segment (28) of the displacement device (17, 28), and secures the displacement device (17, 28) in its position, counter to the effect of the energy accumulator (2).

19. Arrangement according to claim 18, wherein the hook-like segment (9) of the triggering device (9, 10, 11), the displacement device (17, 28), and the energy accumulator (2) can be brought back into their starting state after the front gate (27) has been triggered, and can be activated again.

20. Arrangement according to claim 1, wherein the energy accumulator (2) has a fluid medium.

21. Arrangement according to claim 1, wherein the pivoting lever (15) and the bolt-like segment (18) are fixed in place on the front gate (27) by means of a common assembly part (5).

22. Arrangement according to claim 1, wherein the hinge device (1) can be locked in place in a raised state, as compared with the rest state, after the front gate (27) has been raised.

23. Arrangement according to claim 22, wherein at least one locking device is disposed on the pivoting lever (15) and/or on the arm or arms (3, 4), which device prevents the relative movement of pivoting lever (15) and/or arms (3, 4) in the raised state of the front gate (27).

24. Arrangement according to claim 23, wherein the at least one locking device has a cam that engages into a corresponding counter-shape in the raised state of the front gate (27), as compared with the state of rest, and locks pivoting lever (15) and/or arms (3, 4) releasably against one another, in the raised state of the front gate (27).

\* \* \* \* \*